June 16, 1931.   E. W. BALDWIN ET AL   1,810,037
REEL DRIVING MECHANISM FOR HARVESTERS
Filed April 28, 1928
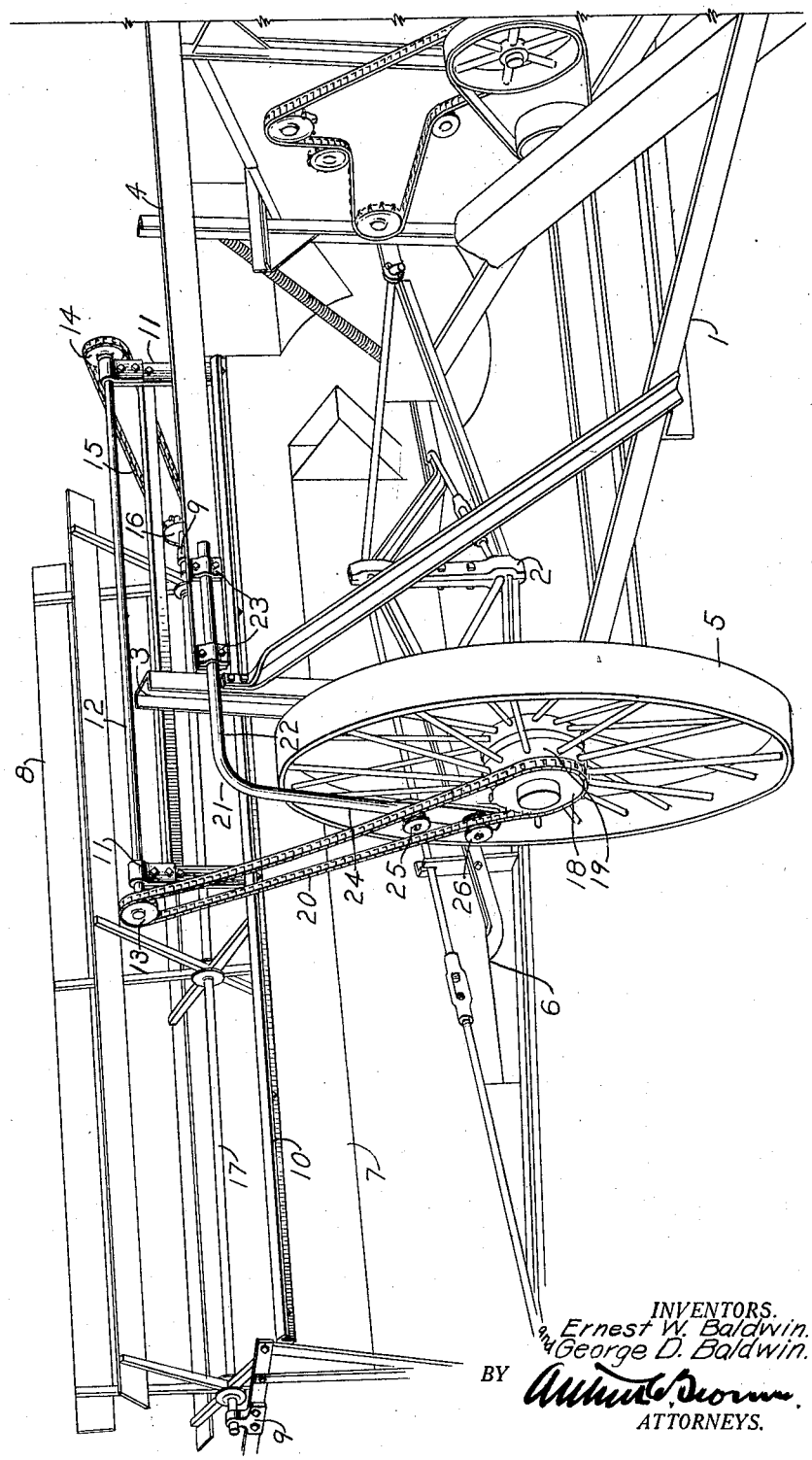
INVENTORS.
Ernest W. Baldwin.
George D. Baldwin.
BY
ATTORNEYS.

Patented June 16, 1931

1,810,037

UNITED STATES PATENT OFFICE

ERNEST W. BALDWIN AND GEORGE D. BALDWIN, OF INDEPENDENCE, MISSOURI, ASSIGNORS TO THE GLEANER COMBINE HARVESTER CORPORATION, OF KANSAS CITY, MISSOURI, A CORPORATION OF DELAWARE

REEL DRIVING MECHANISM FOR HARVESTERS

Application filed April 28, 1928. Serial No. 273,661.

Our invention relates to reels for grain harvesters and more particularly to mechanism for operating the reel at a speed proportionate to the rate of travel of the harvester through the field.

A reel of this character is provided for delivering the heads of the grain to the cutting sickle so that the heads may be severed from the stalk during the travel of the machine through the field, the reel passing the heads toward the threshing and separating mechanism. Should the reel be driven at constant speed, it will tend to beat the grain when the harvester is traveling at low speed and if the harvester is traveling at much higher speed the reel does not become effective on all of the grain. The ordinary means for driving a reel of this character in a combine harvester is the power unit employed for driving the threshing mechanism, whereby the reel is rotated irrespective of the rate of travel of the harvester. Consequently it is the object of our invention to provide driving connection from the running gear of the harvester to the reel so that the reel may be driven in direct proportion to the forward progress of the sickle of the harvester.

In accomplishing these and other objects of the invention we have provided improved details of structure, the preferred forms of which are illustrated in the accompanying drawing, wherein:

The single figure is a perspective view of a portion of a harvester having a reel and driving parts embodying our invention.

Referring in detail to the drawing:

1 designates generally a harvester such as a combine or the like including a truss 2, upright standards 3 and braces, such as 4, and supported from ground or land wheels, including a grain wheel 5. Tiltably supported in the usual manner from the harvester structure in front of the grain wheel is a grain receiving and cutting unit 6 so positioned with relation to the grain wheel that the wheel tracks substantially midway of the length of the cutting unit, the cutting unit being provided with a rear wall 7. A reel 8 is rotatably supported on brackets 9 from the conveying unit, for delivering cut material from the cutting mechanism rearwardly to the conveyor.

Ordinarily the reel is driven from a supplemental power source which drives the mechanism for actuating thresher and separator members.

To accomplish our purpose of driving the reel proportionately to the speed of the harvester, we mount a bar 10 on the wall 7 of the unit 6, and fix spaced brackets 11 on the bar for rotatably supporting a counter shaft 12, on opposite ends of which are keyed sprockets 13 and 14. A chain 15 runs from the sprocket 14 to a sprocket 16 fixed on the inner end of the reel shaft 17 for driving the reel. A sprocket 18 is fixed to the hub 19 of the ground wheel in alignment with the sprocket 13 on the countershaft, and a chain 20 running over the sprockets 18 and 13 transmits motion from the ground wheel to the shaft and reel.

Since the receiving and conveying unit is vertically adjustable to the height of the standing grain, the chain 20 is provided of sufficient length to allow for the raising of the conveyor unit to its extreme height, and means are, therefore, provided for taking up the slack in the chain when the unit is oppositely tilted. A chain guide 21 is provided for this purpose including a supporting bar 22 fixed to the brace bar 4 of the harvester structure by clamps 23 and having a depending and downwardly extending arm 24 carrying rotatable guide rollers 25 and 26 for receiving the upper and lower runs of the chain 20. When the conveyor unit is lowered the chain 20 rests on the rollers 25 and 26, the rollers serving as a fulcrum for the chain and retaining it in taut position.

In operating a combine equipped with our invention, the travel of the grain wheel over the ground causes rotation of the sprocket attached thereto for driving the reel through the chains, countershaft, and sprockets at a rate proportionate to the progress of the cutting unit through the standing grain. The chain guide retains the proper tension in the driving chain running from the land wheel to the countershaft.

The speed at which the machine is moved is regulated to accord with the condition and character of the standing grain, and is moved faster when the straw is light and more slowly when the stand is heavy.

It is apparent that the reel travels proportionate to the progress of the cutting unit through the standing grain even though the machine is turning corners of the field, since the grain wheel tracks substantially centrally of the swath made by the cutting unit and rotates at a speed proportionate to the advance of the center portion of the sickle.

What we claim and desire to secure by Letters Patent is:

1. In combination with the main frame and grain wheel of a harvesting machine, a cutting unit adjustable relative to the main frame, a reel rotatably mounted on the cutting unit, a counter-shaft on the cutting unit operatively connected with the reel, a flexible driving connector operably connecting the counter-shaft and the grain wheel, and means on the main frame, including a rolling fulcrum for said flexible connector, for maintaining driving relation of said connector with the grain wheel and counter-shaft at different elevations of the cutting unit.

2. In combination with the main frame and grain wheel of a harvesting machine, a cutting unit adjustable relative to the main frame, a reel rotatably mounted on the cutting unit, a counter-shaft on the cutting unit operatively connected with the reel, a flexible connector operably connecting between the counter-shaft and the grain wheel, an arm on said main frame, and rollers on said arm in fulcrum engagement with said flexible connector.

3. In combination with the main frame and grain wheel of a harvesting machine, a cutting unit adjustable relative to the main frame, a reel rotatably mounted on the cutting unit, a counter-shaft on the cutting unit operatively connected with the reel, a flexible connector connecting the counter-shaft and the grain wheel, an arm adjustably clamped on said main frame, and rollers on said arm in fulcrum engagement with said flexible connector.

4. In a harvesting machine, a cutting unit including a sickle, and a reel for moving grain into contact with the sickle, a grain wheel tracking substantially centrally of the swath cut by the sickle, and means for driving the reel from the grain wheel whereby the reel is rotated proportionately to the advance of the cutting unit.

5. In a harvesting machine, a cutting unit including a sickle, and a reel for moving grain into contact with the sickle, a grain wheel tracking substantially centrally of the swath cut by the sickle, means for driving the reel from the grain wheel including a sprocket on the grain wheel, a counter-shaft rotatably mounted on the cutting unit, a sprocket on one end of the counter-shaft aligning with the wheel sprocket, a chain operating over the sprockets, a sprocket on the other end of the counter-shaft, and a chain operating over the last named sprocket to drive the reel.

In testimony whereof we affix our signatures.

ERNEST W. BALDWIN.
GEORGE D. BALDWIN.